United States Patent
Konersmann

(10) Patent No.: US 7,356,846 B2
(45) Date of Patent: Apr. 8, 2008

(54) UNILATERAL SESSION KEY SHIFTING

(75) Inventor: Scott A Konersmann, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 10/824,162

(22) Filed: Apr. 14, 2004

(65) Prior Publication Data

US 2005/0232427 A1 Oct. 20, 2005

(51) Int. Cl.
*G06F 17/30* (2006.01)
(52) U.S. Cl. ............... 726/26; 726/27; 726/3
(58) Field of Classification Search ............ 726/26, 726/29, 27, 3, 25
See application file for complete search history.

(56) References Cited

U.S. PATENT DOCUMENTS

| | | | |
|---|---|---|---|
| 5,689,565 | A | 11/1997 | Spies et al. |
| 5,790,677 | A | 8/1998 | Fox et al. |
| 6,134,658 | A | 10/2000 | Multerer et al. |
| 2002/0049900 | A1 | 4/2002 | Patrick |
| 2003/0016653 | A1 | 1/2003 | Davis |
| 2003/0021416 | A1 | 1/2003 | Brown et al. |
| 2003/0074579 | A1 | 4/2003 | Della-Libera et al. |
| 2003/0194093 | A1 | 10/2003 | Evans et al. |
| 2003/0208677 | A1 | 11/2003 | Ayyagari et al. |
| 2003/0217288 | A1 | 11/2003 | Guo et al. |
| 2003/0226017 | A1 | 12/2003 | Palekar et al. |

OTHER PUBLICATIONS http://www.microsoft.com/presspass/exec/flessner/04-11flessner teched.mspx, year 2002.* http://tools.ietf.org/html/draft-ietf-sip-rfc2543bis-09, section 26, year 2002.* http://www.verisign.com/wss/WS-SecureConversation.pdf, Dec. 18, 2002.*

Observer-based chaos synchronization in the generalized chaotic Lorenz systems and its application to secure encryption Celikovsky, S.; Lynnyk, V.; Sebek, M.; Decision and Control, 2006 45th IEEE Conference on Dec. 13-15, 2006 pp. 3783-3788.*

(Continued)

*Primary Examiner*—David Y Jung
(74) *Attorney, Agent, or Firm*—Amin, Turocy & Calvin, LLP

(57) ABSTRACT

A system and method that facilitate secure communication employing dialog session keys that can be shifted unilaterally is provided. A key exchange key can further be employed to encrypt and/or decrypt the dialog session keys that are used to encrypt and/or decrypt message(s) that form a dialog between services. For example, the key exchange key can be unique to a service pair, while a first dialog session key is unique to message(s) originated by a first service, and, a second dialog session key is unique to message(s) originated by a second service.

The system allows the dialog session keys to be independently managed by each endpoint (e.g., service). This makes updating the dialog session key very easy and lightweight compared to other messaging systems, where both endpoints must agree on the updated session key. An endpoint can shift the dialog session key for message(s) it originates based on a dialog session key policy (e.g., time-based, upon receipt of a change in the second dialog session key, and/or receipt of shifts of shifts the second dialog session key more than a threshold quantity of times in a given time period).

22 Claims, 11 Drawing Sheets

OTHER PUBLICATIONS

U.S. Appl. No. 10/824,161, filed Apr. 14, 2004, Scott A. Konersmann et al.

Maurizio Kliban Boyarsky, Public-key Cryptography and Password Protocols: The Multi-User Case, CCS'99, 1999, pp. 63-72, Singapore.

Emmanuel Bresson, et al., Provably Authenticated Group Diffie-Hellman Key Exchange, CCS'01, 2001, pp. 255-264, Philadelphia, Pennsylvania, USA.

Alain Mayer, et al., Secure Protocol Transformation via "Expansion": From Two-party to Groups, CCS '99, 1999, pp. 83-92, Singapore.

Yuliang Zheng, et al., Compact and Unforgeable Key Establishment over an ATM Network, Monash University, 1998, 8 pages.

http://msdn.microsoft.com/msdnmag/issues/03/07/DesignsPatterns/, Jul. 2003.

http://tools.ietf.org/id/draft-ietf-sip-session-timer.10.txt, May 2003.

http://tools.ietf.org/html/draft-ieft-sip-rfc2543bis-09,section 26, yr—2002.

http://www.microsoft.com/presspass/exec/flessner/04-11flessnerteched.mspx, yr-2002.

http://www.ietf.org/rfc/rfc3325.txt, yr-2002.

* cited by examiner

UNILATERAL SESSION KEY SHIFTING

CROSS-REFERENCE TO RELATED APPLICATIONS

This application is related to co-pending U.S. utility application Ser. No. 10/824,161 filed on Apr. 14, 2004, entitled SESSION KEY EXCHANGE KEY, the entirety of which is incorporated herein by reference.

TECHNICAL FIELD

The present invention relates generally to computer system(s), and more particularly to systems and methods to facilitate secure exchange of information between service brokers.

BACKGROUND OF THE INVENTION

Computer network(s) have revolutionalized many aspects of modern life. Businesses are able to connect to one another's computer networks to, for example, retrieve information and/or even store information. However, with this freedom comes risk, such as, the ability of unauthorized user(s) retrieving and/or modifying information stored on a computer network.

Security frameworks have been developed to protect data transmitted in distributed computing systems. Conventional security frameworks have an assortment of degrees of privacy, security, adaptability and scalability. For example, the Kerberos system provides secure communications by users sharing a key with a third party. In order to conduct secure communications, each party connects to the third party and utilizes the key issued by the third party. Among other disadvantages, the Kerberos system allows the third party to track the identities of users who are communicating with each. Furthermore, the third party has the ability to decrypt messages because the third party issues the keys. The Kerberos security model is fixed; that is, administrators have limited flexibility in deployment options.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for system(s) and method(s) that facilitate secure communication employing dialog session keys that can be shifted unilaterally. Dialogs are conversations that involve messages being sent and received by two broker services. A key exchange key is further employed to encrypt and/or decrypt the dialog session keys that are used to encrypt and/or decrypt message(s) that form a dialog between services. For example, the key exchange key can be unique to a service pair, while a first dialog session key is unique to message(s) originated by a first service, and, a second dialog session key is unique to message(s) originated by a second service.

In accordance with an aspect of the present invention, a dialog communication system is provided. The system can be employed to facilitate a secure transfer of messages forming a dialog between a first broker service and a second broker service. A service can include a secure message generation system and a secure message receiver system. The service can further include, optionally, an input queue and/or an output queue.

The system can facilitate end-to-end encryption of message data in a dialog—message data is encrypted at one dialog endpoint and not decrypted until it reaches the other dialog endpoint. The existence of queue(s) allows a conversation to continue reliably between the services, even if one service is temporarily unavailable at some point during the conversation.

A service can choose to authenticate the other service through private key authentication. For example, this can allow users that don't belong in the same trust domain access to a service as long as the target services recognize the user's certificates. Thus, the broker services have an autonomous nature.

In accordance with an aspect of the present invention, to maintain the loosely coupled and autonomous nature of services, the exchange of "per dialog" dialog session keys is designed so that each side of the conversation can unilaterally decide on the dialog session key used for sending message(s) to the other service, and, when such key is updated (e.g., without having to consult the other endpoint). Thus, the system does not require negotiation between the services to change the dialog session key and/or advance notice of the change.

The system design allows the dialog session key to be independently managed by each endpoint (e.g., service). This makes updating the dialog session key very easy and lightweight compared to other messaging systems, where both endpoints must agree on the updated session key.

In accordance with another aspect of the present invention, a dialog endpoint (e.g., service) can employ its own dialog session key for message(s) that it originates. For example, a first endpoint can generate a dialog session key upon creation of its dialog endpoint state. The dialog session key is passed to a second endpoint when a message is sent, as discussed in greater detail below. The dialog session key is employed to encrypt and sign messages going from a first endpoint to a second endpoint. Similarly, the second endpoint can also generate its own dialog session key, pass this second dialog session key to the first endpoint as part of every message the second endpoint originates. The second endpoint can further encrypt and sign message(s) originating from the second endpoint using this second dialog session key. From the perspective of each endpoint, the dialog session key it generates is used to encrypt messages that are sent by it and the key generated by the far endpoint is used to decrypt messages that are received from that endpoint that form the same dialog.

In a long running dialog, an endpoint can desire to update its dialog session key (e.g., in the middle of a dialog). For example, an endpoint can desire to update its dialog session key because:

The sending user's certificate is about to expire and the endpoint wants to switch to using a new certificate that has a later expiration date; and/or, For extra security, an endpoint may want to regenerate its dialog session key occasionally; this is especially important for long lived dialogs.

Because the system gives each endpoint the freedom to generate its own dialog session key, the endpoint has total leeway in deciding when and how often it updates the dialog session key is employs for message(s) it sends. This is not the case in traditional messaging systems, where generally both endpoints need to agree in order to update a shared session key. A drawback of a shared session key is that the key update process can become very expensive as it requires this two-way handshaking.

In one example, the dialog session key is a symmetric key and is given a globally unique identifier (GUID). The dialog session key is used to encrypt a message and the encrypted symmetric key and its identifier is passed with the message. In this example, if one side of the conversation determines it needs to shift the dialog session key (e.g., based on a policy decision) it simply generates a new dialog session key (e.g., symmetric key) and identifier and begins using the new key on subsequent message(s).

Once a mechanism has been established in which dialog session keys can be changed unilaterally (e.g., by either side of a conversation), additional policy can be put in place that deals with operation when the other party shifts the dialog session key. For example:

Shift the key once an hour if the target never shifts;
If the target shifts it's key, then shift the initiator's dialog session key;
Fail the communication if the target shifts its dialog session key more than a threshold quantity of times in a given time period; and/or,
Fail the communication if the target fails to shift its dialog session key within a time threshold.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1A:
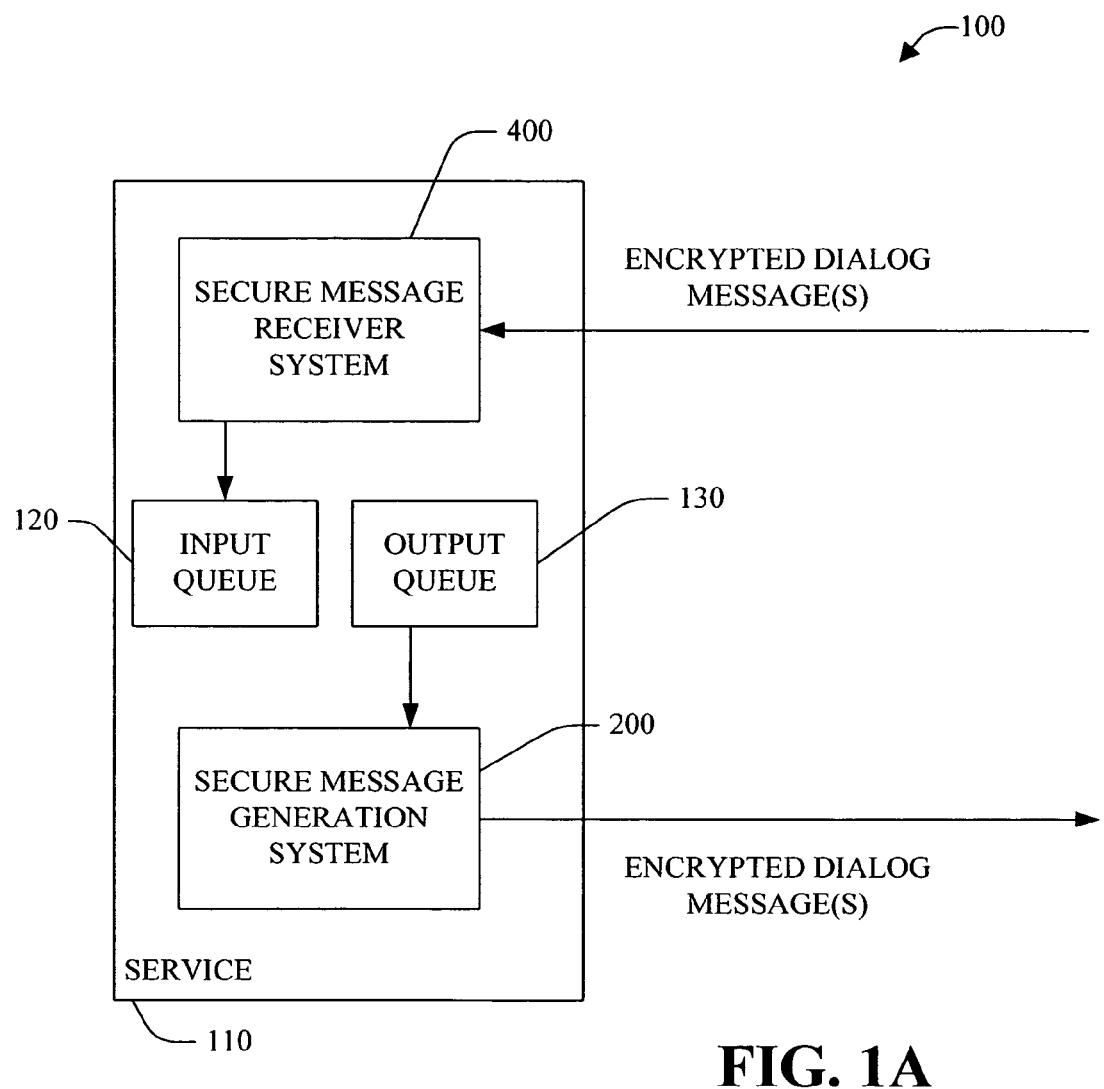
FIG. 1A is a block diagram of a dialog communication system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk; hard disk, EEPROM (electrically erasable programmable read only memory) and memory stick in accordance with the present invention.

"Dialog" refers to a single bidirectional streams of messages between two endpoints (e.g., initiator system and target system(s)). For example, two endpoints can have zero, one or more dialog(s) ongoing at any particular time. In one example, all messages in a dialog are ordered and dialog messages are always delivered in the order sent and exactly once (e.g., same message is never seen by an application twice). The order is maintained across transactions, across input threads, across output threads, and across crashes and restarts. Further, a "message" can include a conversation handle that uniquely identifies the dialog associated with it. For example, an order entry application can have dialogs open simultaneously with a shipping application, an inventory application and a billing application. Because messages from each application have a unique conversation handle, it's easy to tell which application sent each message.

Referring to FIG. 1A, a dialog communication system 100 in accordance with an aspect of the present invention is illustrated. The system 100 can facilitate end-to-end encryption of message data in a dialogs—message data is encrypted at one dialog endpoint and not decrypted until it reaches the other dialog endpoint. A broker service 110 can include a secure message generation system 200, a secure message receiver system 400, and, optionally, an input queue 120, an output queue 130.

Figure 1B:
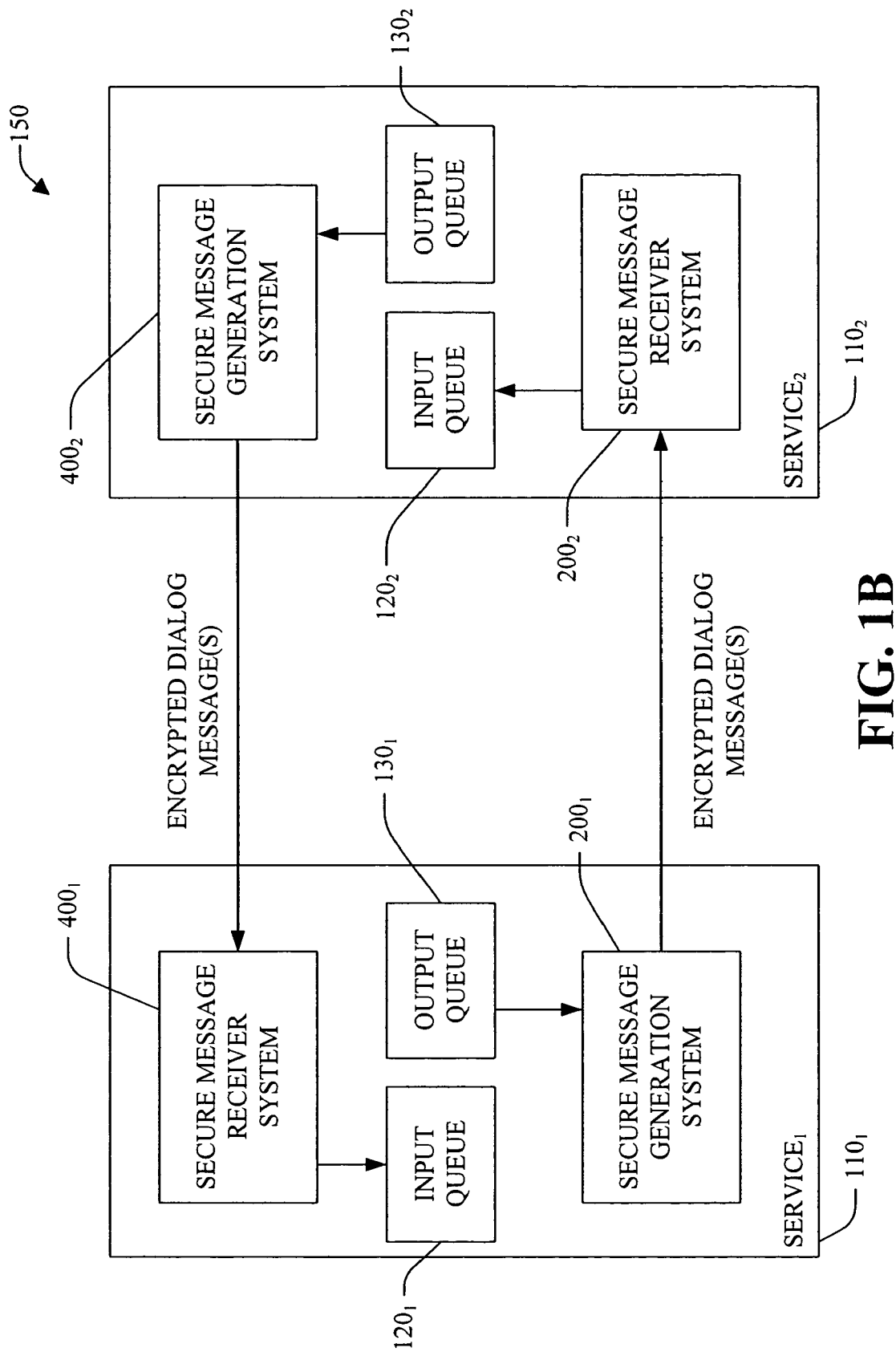
FIG. 1B is a block diagram of a service pair system in accordance with an aspect of the present invention.

Turning briefly to FIG. 1B, a service-pair system 150 in accordance with an aspect of the present invention. The system 150 includes a first broker service 110$_1$ and a second broker service 110$_2$. For example, the system 150 can be employed to facilitate a secure transfer of messages between the first broker service 110$_1$ and the second broker service 110$_2$.

Referring to FIGS. 1A and 1B, dialogs are conversations that involve messages being sent and received by two broker services 110$_1$, 110$_2$. The existence of a queue 120$_1$, 120$_2$, 130$_1$, 130$_2$ allows a conversation to continue reliably between the services 110$_1$, 110$_2$, even if one service is temporarily unavailable at some point during the conversation. As discussed below, a service 110$_1$, 110$_2$, can choose to authenticate the other service through Private Key authentication. For example, this can allow users that don't belong in the same trust domain access to a service as long as the target services recognize the user's certificates. Thus, the broker services 110$_1$, 110$_2$ have an autonomous nature.

In accordance with an aspect of the present invention, to maintain the loosely coupled and autonomous nature of services 110$_1$, 110$_2$, the exchange of "per dialog" dialog session keys is designed so that each side of the conversation can unilaterally decide on the dialog session key used for sending message(s) to the other service, and, when such key is updated (e.g., without having to consult the other endpoint). Thus, the system 100 does not require negotiation between the services 110$_1$, 110$_2$, to change the dialog session key and/or advance notice of the change.

The system 100 design allows the dialog session key to be independently managed by each endpoint (e.g., service 110$_1$, 110$_2$). This makes updating the dialog session key very easy and lightweight compared to other messaging systems, where both endpoints must agree on the updated session key.

Unilateral Dialog Session Key Shifting

As noted, in accordance with an aspect of the present invention, a dialog endpoint (e.g., service 110$_1$, 110$_2$) can employ its own dialog session key for message(s) that it originates. For example, a first endpoint can generate a dialog session key upon creation of its dialog endpoint state. The dialog session key is passed to a second endpoint when a message is sent, as discussed in greater detail below. The dialog session key is employed to encrypt and sign messages going from a first endpoint to a second endpoint.

Similarly, the second endpoint can also generate its own dialog session key, pass this second dialog session key to the first endpoint as part of every message the second endpoint originates. The second endpoint can further encrypt and sign message(s) originating from the second endpoint using this second dialog session key. From the perspective of each endpoint, the dialog session key it generates is used to encrypt messages that are sent by it and the key generated by the far endpoint is used to decrypt messages that are received from that endpoint that form the same dialog.

In a long running dialog, an endpoint can desire to update its dialog session key (e.g., in the middle of a dialog). For example, an endpoint can desire to update its dialog session key because:

The sending user's certificate is about to expire and the endpoint wants to switch to using a new certificate that has a later expiration date; and/or, For extra security, an endpoint may want to regenerate its dialog session key occasionally; this is especially important for long lived dialogs.

Because the system 100 gives each endpoint the freedom to generate its own dialog session key, the endpoint has total leeway in deciding when and how often it updates the dialog session key it employs for message(s) it sends. This is not the case in traditional messaging systems, where generally both endpoints need to agree in order to update a shared session key. A drawback of a shared session key is that the key update process can become very expensive as it requires this two-way handshaking. Additionally, two way handshaking can require that the endpoints be directly addressable (e.g., firewalls can prevent this) and have common lifetimes (e.g., they have to be available during the same time).

In one example, a service 110$_1$ only keeps track of a single dialog session key from a second service 110$_2$ for a given dialog. In this example, in-order processing of messages is employed such that only one dialog session key is valid for the dialog at any point in time. While subsequent message(s) can update/modify the dialog session key, in this example, the service 110$_1$ does not keep track of previous dialog session key(s).

In this example, there are at least two reasons why the service 110$_1$ can desire to not keep track of previous dialog session key(s). First, with respect to a long-lived dialog, there can be a plurality of dialog session keys (e.g., 10,000). Thus, in this example, resources would unnecessarily be wasted to keep track of the plurality of dialog session keys as one or more of them can be outdated (e.g., and may never be needed again). Second, in the event that a service 110$_1$ allows the sender to send messages using a previous dialog session key (e.g., older than the current dialog session key), there would be no way for the service 110$_1$ to distinguish if the received message is authentic or if it is sent by a malicious third party who obtained the dialog session key.

As discussed below, in one example, a dialog session key is a symmetric key and is given a globally unique identifier (GUID). The dialog session key is used to encrypt a message and the encrypted symmetric key and its identifier is passed with the message.

In this example, if one side of the conversation determines it needs to shift the dialog session key (e.g., based on a policy decision) it simply generates a new dialog session key (e.g., symmetric key) and identifier and begins using the new key on subsequent message(s).

When a message arrives, the service 110$_1$, 110$_2$ checks to see if it has a copy of the dialog session key (e.g., symmetric key) based on the GUID. If it does, it can directly decrypt the message body using the previously decrypted dialog session key. If it doesn't, the service 110$_1$, 110$_2$ can determine whether, for example:

This is a new conversation and the full authentication process needs to be performed, as described below.

The key exchange key is the same which means the dialog session key has shifted.

In this case the key exchange key is used to decrypt the new dialog session key and the new dialog session key is stored.

In one example, when a service 110$_1$, 110$_2$ detects that an out of order message is signed and encrypted with a newer dialog session key, in this example, instead of updating (for existing dialog endpoints) or creating (if this is the first message received) the dialog endpoint state with this session key, the service 110$_1$, 110$_2$ drops the message.

In this example, had the service 110$_1$, 110$_2$ chose to process this out of order message, the dialog endpoint state would have been updated with this new dialog session key. When it receives a message that has an earlier sequence number and the message is encrypted with an older dialog session key, it would not be able to decrypt the message since, in one example, the dialog endpoint state only allows updating the dialog session key to a newer dialog session key.

In another example, [0]as an alternative to dropping the out of order message(s), a temporary store for handling out of order message(s) can be provided to insulate the broker service from network service fluctuations. This temporary store can hold message(s) for a short period of time before dropping them. In this example, the temporary store is secure and able to withstand denial of service attacks. For example, the temporary store can be size and CPU limited, and, able to turn itself off under attack (e.g., stop caching)

Once a mechanism has been established in which dialog session keys can be changed unilaterally (e.g., by either side of a conversation), additional policy can be put in place that deals with operation when the other party shifts the dialog session key. For example:

Shift the key once an hour if the target never shifts;
If the target shifts it's key, then shift the initiator's dialog session key;
Fail the communication if the target shifts its dialog session key more than a threshold quantity of times in a given time period; and/or
Fail the communication if the target fails to shift its dialog session key within a time threshold.

It is to be appreciated that the communication system 100, the service 110, the input queue 120, the output queue 130 and/or the service pair system 150 can be computer components as that term is defined herein.

Key Exchange Keys and Dialog Session Keys

System(s) and method(s) of employing a key exchange key and a dialog session key to facilitate secure communication are set forth in greater detail in co-pending U.S. utility application No. Ser. No. 10/824,161, filed on Apr.14, 2004 and entitled "SESSION KEY EXCHANGE KEY" which is incorporated herein by reference.

Secure Message Generation System 200

Figure 2:
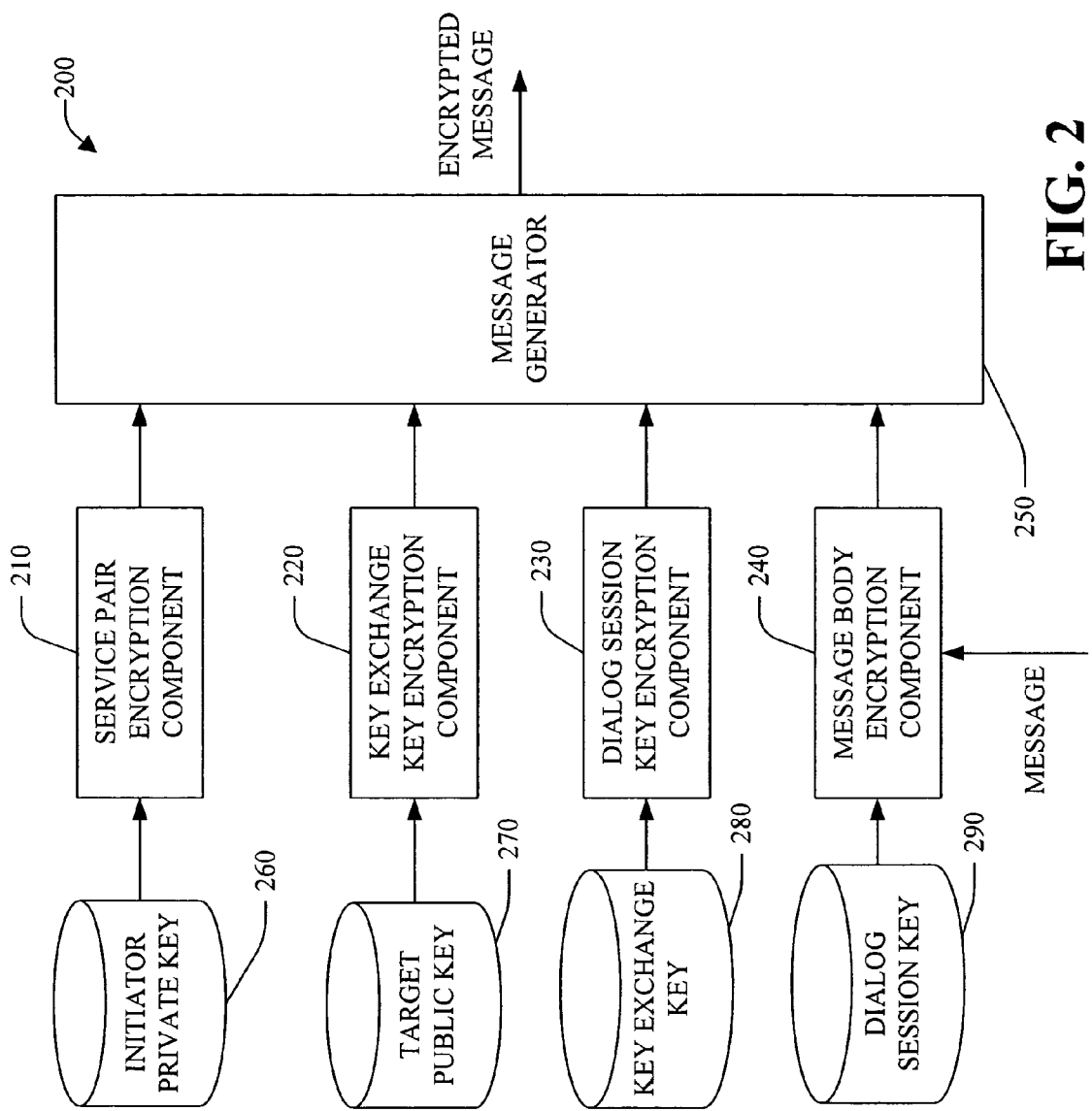
FIG. 2 is a block diagram of a secure message generation system in accordance with an aspect of the present invention.

Referring to FIG. 2, a secure message generation system 200 in accordance with an aspect of the present invention is illustrated. For example, the system 200 can be employed to facilitate a secure transfer of message(s) between two services $110_1$, $110_2$. The system 200 can facilitate end-to-end encryption of message data in a dialog. This means that the message data is encrypted at one dialog endpoint and not decrypted until it reaches the other dialog endpoint.

Additionally, the system 200 can further facilitate:
Dialog Authentication: One or both endpoints of a conversation can verify the authenticity of the other endpoint;
Authorization Access Control: Can be imposed on authenticated users to ensure that only authorized actions (send, receive and enqueue) can be performed; and/or,
Message integrity check (MIC): A MIC that covers the message body as well as certain header(s) can be sent with a message so that the receiving endpoint can verify that the message is intact.

Accordingly, the system 200 can facilitate creation of dialog(s) as needed by the application developer. Thus, in one example, a programming model where a dialog is created for each unit of work required to accomplish a task is encouraged.

Additionally, the system 200 can be employed to facilitate secure dialog with minimal performance overhead when compared with conventional system(s). Optionally, the system 200 can facilitate load balancing (e.g., among deployed instances of a service). In this example, secured dialogs to a service can be location transparent so that a dialog targeted to a service can be able to talk to any instance of the same service transparently without any additional security setup.

The system 200 employs public key/private key asymmetric encryption technique(s) to authenticate and secure information (e.g., message(s) and/or session key(s)) exchanged between an initiator system (not shown) and a target system (not shown). Asymmetric encryption involves two digital keys—a public key and a private key. These keys have the useful property that something encrypted with the public key can only be decrypted with the private key and something encrypted with the private key can only be decrypted with the public key. As the names imply, the private key is a closely guarded secret that must be protected and the public key can be distributed to anybody. The system 200 further employs symmetric encryption. With symmetric encryption the same encryption key employed to encrypt a message is also employed to decrypt the message.

The system 200 includes a service pair encryption component 210, a key exchange key encryption component 220, a dialog session key encryption component 230, a message body encryption component 240 and a message generator 250. The system 200 can employ an initiator private key 260, a target public key 270, a key exchange key 280 and/or a dialog session key 290.

The initiator private key 260 is the private component of a public/private asymmetric pair associated with an initiator of a message. The target public key 270 is the public component of a public/private asymmetric pair associated with a target of the message.

A key exchange key 280 is a per service pair (e.g., initiator and target) symmetric key that allows dialogs between two services (e.g., $110_1$, $110_2$) to skip the per dialog session key decryption operation, as well as the per message signature verification operation. In one example, a particular key exchange key 280 can be employed by a service pair for substantially all dialog(s) between them.

The key exchange key 280 can serve as a level of indirection between an authentication header and the dialog session key 290. For example, the key exchange key 280 can be encrypted with the target public key 270 and can be sent as part of a key exchange key header (discussed below) in message(s) exchanged between the two services. The key exchange key 280 can further be employed to encrypt the dialog session key 290.

A dialog session key 290 can be a symmetric key (e.g., randomly generated by a session key generator (not shown)). The dialog session key 290 can be employed, for example, to encrypt and/or decrypt message(s) that form a dialog between an initiator system and a target system. Conventional messaging system have employed public/private pair asymmetric encryption which are orders of magnitude more computationally expensive to perform compared to symmetric key operations employed with the dialog session key 290.

For security reasons, the per dialog session key 290 generally is not shared among dialogs between the same two service. If the per dialog session key 290 is shared, once an unauthorized entity (e.g., attacker) obtains the dialog session key 290, the unauthorized entity will be able to decrypt messages in the dialogs encrypted with the compromised dialog session key 290.

As discussed previously, in accordance with an aspect of the present invention, in one example, each endpoint (e.g., $110_1$, $110_2$) of a conversation generates a unique dialog session key 290 used in encrypting messages originating from that endpoint to the other endpoint. This allows the "per dialog" dialog session key 290 to be updated by each endpoint independently without consulting with the other endpoint.

Exemplary Secure Message Structure 300

Figure 3:
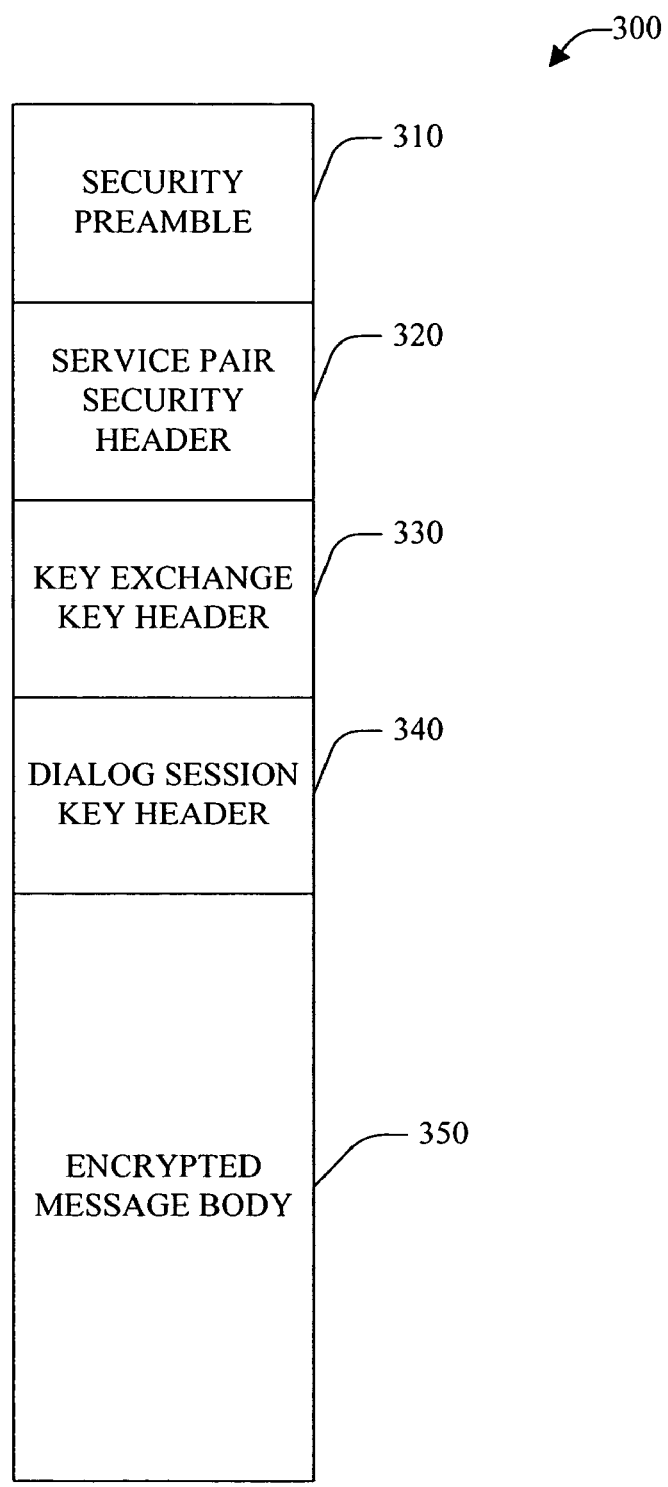
FIG. 3 is a block diagram of an exemplary secure message structure in accordance with an aspect of the present invention.

Referring briefly to FIG. 3, an exemplary secure message structure 300 in accordance with an aspect of the present invention is illustrated. The secure message structure 300 can include a security preamble 310, a service pair secure header 320, a key exchange key header 330, a dialog session key 340 and a message body 350.

Turning to FIGS. 2 and 3, upon receipt of a message to be encrypted, the system 200 can provide a secure message based, for example, at least in part, upon the structure 300 as an output. In this example, the service pair encryption component 210 is responsible for generating the service pair security header 320; the key exchange key encryption component 220 is responsible for generating the key exchange key header 330; the dialog session key encryption component 230 is responsible for generating the dialog session key header 340; and, the message body encryption component 240 is responsible for generating the message body 350.

Security Preamble 310

The security preamble 310 can include general security information. In one example, the security preamble 310 includes:

TABLE 1

| Field | Size (Bytes) | Usage |
| --- | --- | --- |
| Version | 2 | Two byte version information. First byte is major and second byte is minor. |
| MIC | 16 | Message integrity check |
| Time | 4 | Absolute GMT time the message was created. |
| Salt | 16 | Encryption Salt value used for this message instance. |

In one example, the security preamble 310 is generated by the message generator 250.

Service Pair Security Header 320

The service pair security header 320 is used to securely convey authentication information. In one example, the fields in the service pair security header 320 include:

TABLE 2

| Field | Size (Bytes) | Usage |
| --- | --- | --- |
| Initiator Cert Name | Nvarchar(512) | Certificate name of the initiating service. |
| Initiator Cert Issue Date | Nvarchar(32) | Date the certificate was certified. |
| Target Cert Name | Nvarchar(512) | Certificate name of the target service |
| Target Cert Issue Date | Nvarchar(32) | Date the target service's certificate was issued. |
| Signature | 16 | Signature over the dialog security header |

For example, the signature can be a one-way hash (e.g., MD5) of the previous fields encrypted with the initiator private key 260. The signature is checked to ensure the contents weren't altered in transit. The certificate issuer name and serial number identify the certificate used to authenticate the dialog connection. For example, this information can be used to look up the certificate (e.g., in a syscertificates meta-data table) so the certificate can be mapped to a user. This user can then used to perform authorization checks while processing the message.

The service pair security header 320 can be generated by the service pair encryption component 210 based, at least in part, upon the initiator private key 260.

Key Exchange Key Header 330

The key exchange key header 330 is used to securely convey a key exchange key 280. In one example, the key exchange key 280 is also a 128-bit symmetric key. For example, a service pair can have their own key exchange key 280 so that substantially all dialogs between the service pair employ the same key exchange key 280.

The key exchange key header 330 can include, for example:

TABLE 3

| Field | Size (Bytes) | Usage |
| --- | --- | --- |
| key exchange key ID | 16 | Key exchange key ID |
| key exchange key | 16 | Encrypted key exchange key |

Optionally, the key exchange key 280 can be persisted in the dialog endpoint tables (e.g., for the life of the dialog), and, can further be identified by a GUID sent with a message. In this example, the key exchange key header 330 includes a key exchange key ID associated with the GUID. The GUID can be checked before the key exchange key 280 is used in case the key exchange key 280 has been changed by the initiator of the message. The key exchange key 280 is encrypted with the target public key 270 by the key exchange key encryption component 220.

Dialog Session Key Header 340

Messages are encrypted and the MIC is encrypted using the dialog session key 290 associated with the dialog. The dialog session key 290 can be generated and assigned an identifier (e.g., dialog key ID, for example, a GUID) by the dialog initiator. For example:

TABLE 4

| Field | Size (Bytes) | Usage |
| --- | --- | --- |
| Dialog key ID | 16 | Dialog session key ID |
| Dialog key | 16 | Encrypted dialog session key |

In one example, the dialog session key 290 is a 128-bit symmetric key which is used for a dialog (e.g., one-way). A complete dialog uses two dialog session keys 290—one for messages going each direction.

Optionally, the dialog session key 290 can be persisted in the dialog endpoint tables (e.g., for the life of the dialog), and, can further be identified by a GUID sent with a message. The GUID can be checked before the dialog session key is used in case the dialog session key has been changed by the initiator of the message.

Since the dialog session key 290 is sent in the message header, it must be encrypted. In accordance with an aspect of the present invention, instead of encrypting it with a private key which is a computationally expensive operation, the dialog session key 290 is encrypted with the key exchange key 280.

Message Body 350

Data integrity and privacy are provided for dialog messages by computing a Message Integrity Check (MIC) on message and header data and by encrypting the message body. For example, encryption and MIC checking can be performed by the message body encryption component 240 (e.g., in the Transport layer).

In one example, the MIC is computed using a one-way hash algorithm (e.g., MD5) over the message body and the header fields which don't change as the message is routed to its target. This hash is encrypted with the dialog session key 290 and put into the message header so it can be checked at the message target to ensure the data didn't change in transit.

After the MIC is computed on the message body, the message contents are encrypted (e.g., using an RC2 algorithm) with the dialog session key 290. For example, when the message arrives at its final target, it is decrypted with the dialog session key 290 before it is placed into a message queue associated with the target.

Use of Key Exchange Key 280

A key exchange key 280 that can be reused across multiple dialogs between two services eliminates the need for a service to perform the costly public key operation for every dialog.

For example, when the initiator begins a second dialog can use the service pair header 320 and the key exchange key header 330 that were computed for the first dialog. When the target receives the message, it notices that it already cached the key exchange key 280 and can go ahead and decrypt the "per dialog" dialog session key 290. It can then use the dialog session key 290 to decrypt the messages sent by the initiator as well as verify its MIC.

In one example, the dialog session key 290 is a 128-bit symmetric key which is used for a dialog in one direction—a complete dialog uses two dialog session keys 290—one for messages going each direction. In this example, if the dialog session key 290 is employed for message(s) going in only one direction, the only thing the target needs to create for each dialog is the "per dialog" dialog session key header 340 for messages that go from the target to the initiator. This includes generation of the dialog session key 290 and encryption of the dialog session key 290 with the key exchange key 280. Significantly, in this example, new dialog(s) between actively communicating services involve no public key operations, thus allowing secure dialog(s) to be created with minimal overhead.

It is to be appreciated that the system 200, the service pair encryption component 210, the key exchange key encryption component 220, the dialog session key encryption component 230, the message body encryption component 240 and/or the message generator 250 can be computer components as that term is defined herein.

Secure Message Receiver System 400

Figure 4:
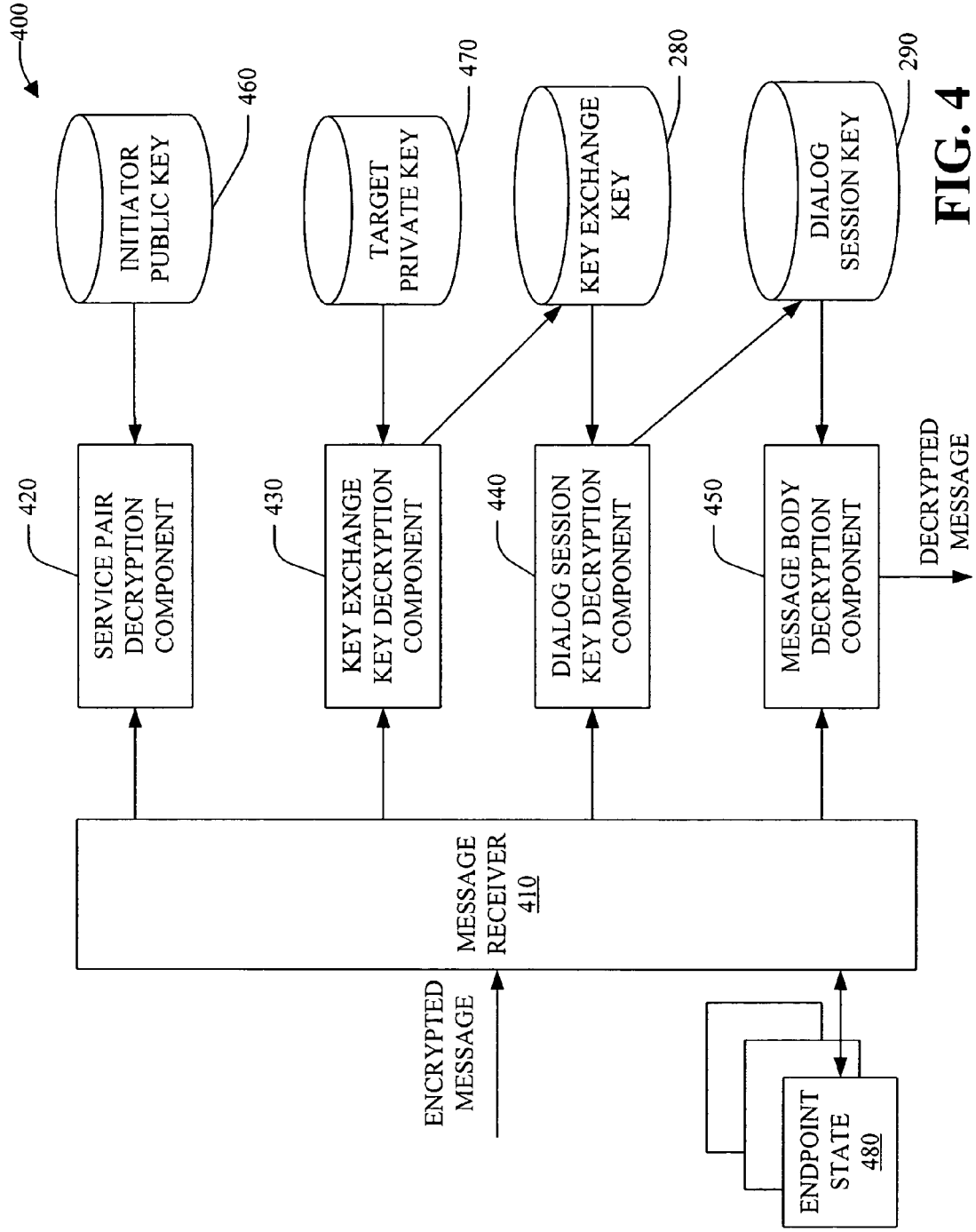
FIG. 4 is a block diagram of a secure message receiver system in accordance with an aspect of the present invention.

Next, turning to FIG. 4, a secure message receiver system 400 in accordance with an aspect of the present invention is illustrated. The system 400 includes a message receiver 410 that receives encrypted messages, for example, from a message generation system 200. The system 400 further includes a service pair decryption component 420, a key exchange key decryption component 430, a dialog session key decryption component 440 and a message body decryption component 450.

The message receiver 410 receives the encrypted message and validates the security preamble 310. Thereafter, the message receiver 410 provides appropriate parts of the message to components of the system 400. For example, the message receiver can provide the service pair security header 320 to the service pair decryption component 420; the key exchange key header 330 to the key exchange key decryption component 430, the dialog session key header 340 to the dialog session key decryption component 440; and, the message body 350 to the message body decryption component 450.

The service pair decryption component 420 can employ an initiator public key 460 to decrypt information associated with the service pair security header 320, for example, to verify authentication information (e.g., as set forth in Table 3 above). For example, the service pair decryption component 420 can employ a signature of the service pair security header 320 to ensure that contents of the encrypted message were not altered in transit. The service pair decryption component 420 can further employ a certificate issuer name and serial number that identify the certificate used to authenticate the dialog connection (e.g., initiator and/or target). For example, this information can be used to look up the certificate (e.g., in a syscertificates meta-data table) so the certificate can be mapped to a user which can be employed to perform authorization checks. The service pair decryption component 420 can, optionally, cache one or more service pair security headers 320, for example, to reduce message decryption processing time.

The key exchange key decryption component 430 can employ a target private key 470 to decrypt the key exchange key 280 encrypted in the key exchange key header 330. The key exchange decryption component 430 can store the key exchange key 280 for use by the dialog session key decryption component 440. The key exchange key decryption component 430 can, optionally, cache one or more key exchange key headers 330, for example, to further reduce message decryption processing time.

The dialog session key decryption component 440 can employ the key exchange key 280 to decrypt the dialog session key 290 encrypted in the dialog session key header 340. The dialog session key decryption component 440 can store the dialog session key 290 for use by the message body decryption component 450. The dialog session key decryption component 440 can, optionally, cache one or more dialog session key headers 340, to even further reduce message decryption processing time.

The message body decryption component 450 can employ the dialog session key 290 to decrypt the message body 350. The message body decryption component 450 can provide a decrypted message as an output.

Processing of Initial Message of a Dialog from a Given Source

In this example, the first time a system 400 (e.g., associated with a target endpoint) receives an encrypted message from a given source (e.g., initiator), the key exchange key decryption component 430 decrypts the key exchange key 280 and caches the key exchange key 280 and its associated key ID. The key exchange key 280 is then employed by the dialog session key decryption component 440 to decrypt the dialog session key 290 for the dialog.

Processing of Initial Message of a Dialog from a Known Source

When a dialog is started, the key exchange key ID in the key exchange key header can be checked against the cache of key exchange keys and associated key exchange key IDs. If the key exchange key ID is found, the key exchange key can be used without performance of the key exchange key decryption using the target private key 470.

Checking the key exchange key ID on dialog creation allows the key exchange key 280 to be changed at any time.

In this example, the key exchange key 280 is cached in memory so if the database is restarted, it will be obtained from the next dialog initiation message it receives.

Exemplary Processing of Message(s) by System 400

In this example, when the system 400 receives a message sent on a secure dialog, the system 400 can perform the following to decrypt the message. The message receiver 410 can determine whether a dialog endpoint state 480 associated with the dialog exists. If the endpoint state 480 is not found, then the received message is the first one received for this dialog. Accordingly, a dialog endpoint 480 is created.

The dialog endpoint state 480 can store information associated with the state of a dialog including, for example, the current dialog session key 290 associated with the dialog.

The message receiver 410 can further determine whether the service pair security header 320, the key exchange key header 330 and the dialog session key header 340 is cached. If they are cached, the processing of these headers 320, 330, 340 can be skipped and the decrypted dialog session key 290 can be employed to decrypt the received message.

If the service pair security header 320, the key exchange key header or the dialog session key header 340 is not cached, the header(s) that were cached can be validated and the appropriate key(s) (e.g., key exchange key 280 and/or dialog session key 290) can be decrypted. Optionally, if the validation is successful, the system 400 can determine a database user identity based, at least in part, upon the initiator' certificate information of the service pair security header 320.

Once the headers have been validated and the security information is available, the dialog endpoint state is updated with this new information. In addition, the service pair security header 320, the key exchange header 330 and/or the dialog session key header 340 can be added to the cache.

Optionally, the context user can be set to the database user mapped to the sender's certificate. A check can further be performed to determine whether this user has permission to enqueue to the service's queue or not. If not, the message is discarded.

Total Caching Flexibility

The system 200 and/or the system 400 can allow total flexibility in caching as the system 200 and/or the system 400 can work properly even when no header(s) and/or key(s) are cached. As noted above, the service pair security header 320, the key exchange key header 330 and/or the dialog session key header 340 can be cached to facilitate performance enhancements.

In one example, to maximize performance gains, both the "per service pair" key exchange key 280 and the "per dialog" dialog session key are cached (e.g., at each endpoint of the dialog). However, each message comprises sufficient information to derive the key exchange key 280 and the dialog session key 290. Thus, in the event that an endpoint chooses not to cache one or both of these keys, the message can be decrypted as noted previously. This allows the endpoints total freedom in deciding how much resource it desires to devote to caching, or even whether it wants to devote any resource to caching at all.

Dynamic Rerouting of Secured Dialog

The system 200 and/or the system 400 allow a secure dialog to be directed to any instance of a service without any additional security setup. For example, message(s) initially targeting an instance of a service can be redirected to another instance of that service midway through the dialog. Thus, if an instance of a service fails, messages destined for that service can be transparently rerouted to other instances of that service.

The ability for dialogs to be rerouted midway is especially important for graceful failover through database mirroring. If a service is mirrored on two databases, and the principal database fails, messages can be rerouted to the mirrored service and processing can continue without interruption from the point where the failure occurred.

For example, if the first three messages were already processed at the principal when the dialog failed, the mirror can simply go through the steps necessary to derive the key exchange key 280 and dialog session key 290, and use the dialog session key 290 to decrypt subsequent messages in the dialog.

In this example, the system 200 and/or the system 400 are able to facilitate dynamic rerouting of secured dialogs as:

A service is only addressable by name and not by its physical address;

Instances of the same service share the same private/public key pair; and,

Information required to derive the "per service pair key" exchange key 280 and the "per dialog" dialog session key 290 are embedded in each message header.

It is to be appreciated that the system 400, message receiver 410, the service pair decryption component 420, the key exchange key decryption component 430, the dialog session key decryption component 440, the message body decryption component 450, the initiator public key, the target private key 470 and/or the endpoint state 480 can be computer components as that term is defined herein.

Turning briefly to FIGS. 5-9, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 5:
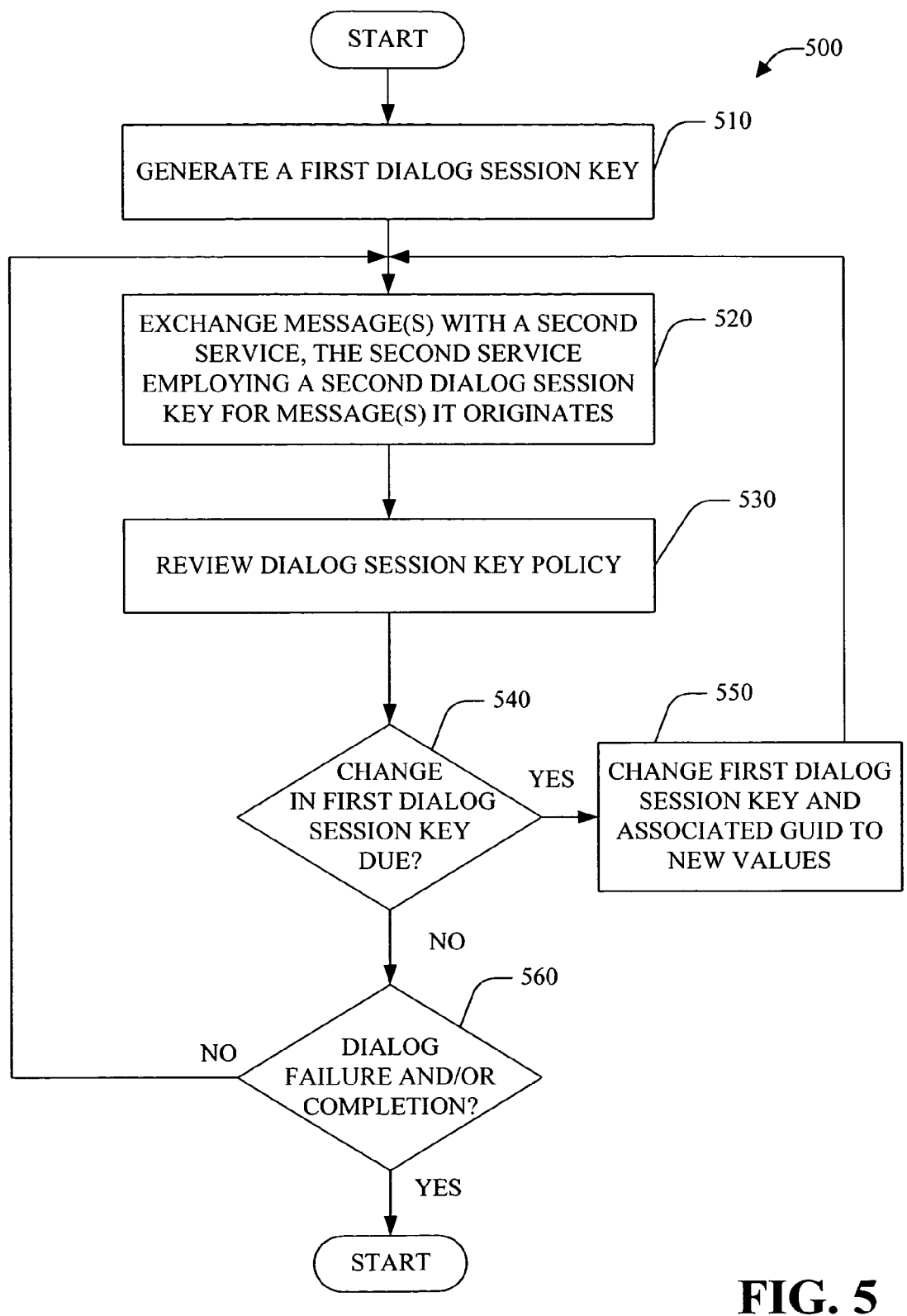
FIG. 5 is a flow chart of a method facilitating secure communication in accordance with an aspect of the present invention.

Referring to FIG. 5, a method 500 facilitating secure communication in accordance with an aspect of the present invention is illustrated. At 510, a first dialog session key is generated (e.g., by a secure message generation system 200). At 520, message(s) are exchanged with a second service, the second service employing a second dialog session key for message(s) it originates.

At 530, a dialog session key policy is reviewed (e.g., by the secure message generation system 200). In one example, the dialog session key policy is time-based (e.g., shift the dialog session key once an hour, the second service does not shift it's dialog session key). In another example, the dialog session key policy is based, at least in part, upon receipt of a change in the second dialog session key (e.g., if the second service shifts the second dialog session key, then the first dialog session key is also changed). In yet a third example, the dialog session key policy can be based on excessive shifting of the second dialog session key (e.g., if the second service shifts the second dialog session key more than a threshold quantity of times in a given time period, the communication is failed). In a fourth example, the dialog session key policy can be based on a failure to shift the second dialog session key by the second service within a time threshold. Those skilled in the art will recognize that these dialog session key policies are merely exemplary. Thus, it is to be appreciated that any type of dialog session key policy suitable for carrying out the present invention can be employed and all such types of policies are intended to fall within the scope of the hereto appended claims.

Next, at 540, a determination is made as to whether a change of the first dialog session key is due (e.g., based, at least in part, upon the dialog session key policy). If the determination at 540 is YES, at 550, the first dialog session key and its associated GUID are changed to new values, and, processing continues at 520.

If the determination at 540 is NO, at 560, a determination is made as to whether the dialog has failed (e.g., based, at least in part, upon the dialog session key policy) and/or the dialog has been completed. If the determination at 560 is NO, processing continues at 520. If the determination at 560 is YES, no further processing occurs.

Figure 6:
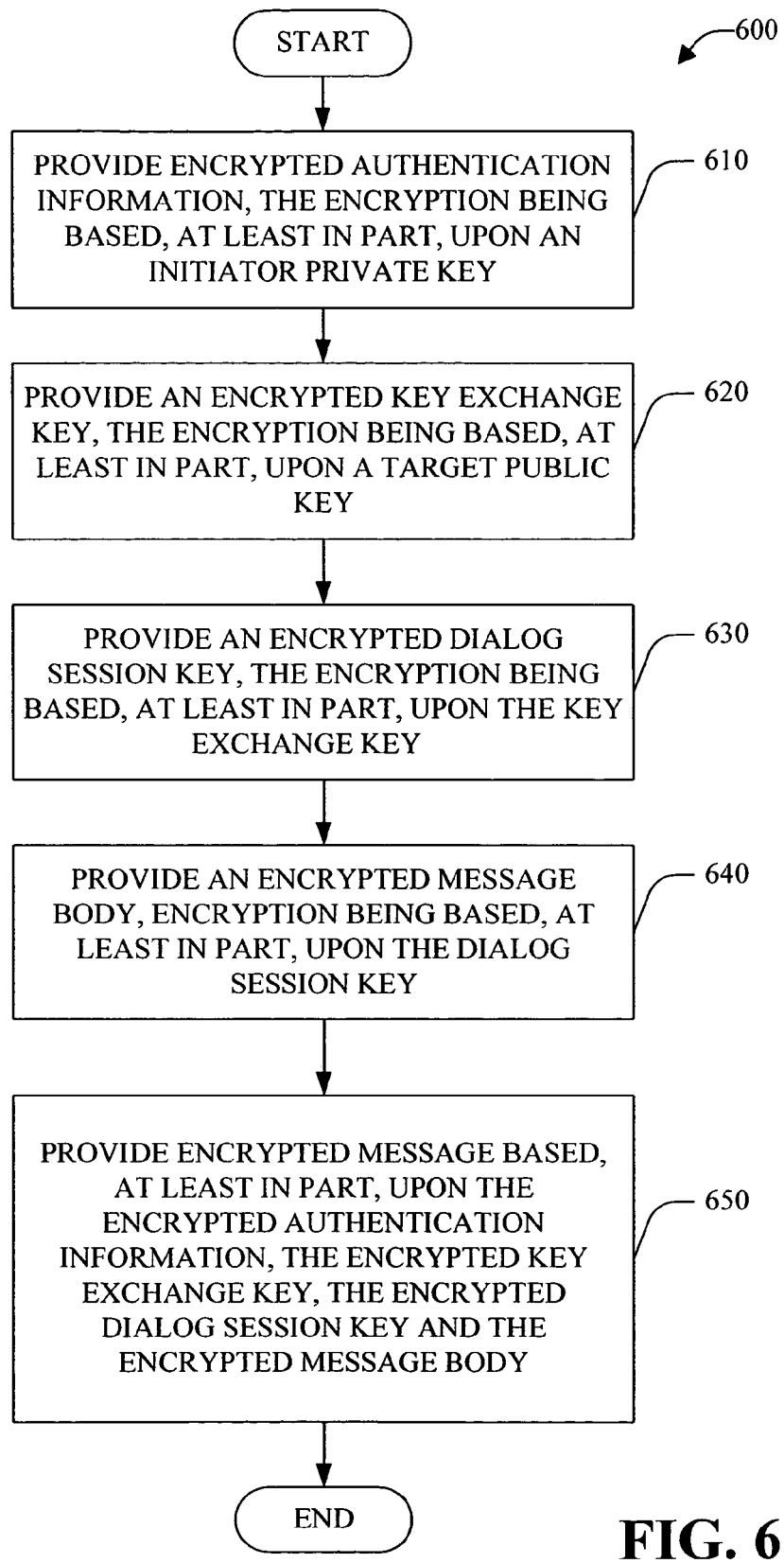
FIG. 6 is a flow chart of a method facilitating secure message generation in accordance with an aspect of the present invention.

Referring to FIG. 6, a method 600 facilitating secure message generation in accordance with an aspect of the present invention is illustrated. At 610, encrypted authentication information, encryption being based, at least in part, upon an initiator private key is provided (e.g., by a service pair encryption component 210). At 620, an encrypted key exchange key, the encryption being based, at least in part, upon a target public key, is provided (e.g., by a key exchange key encryption component 220).

At 630, an encrypted dialog session key, the encryption being based, at least in part, upon the key exchange key, is provided (e.g., by a dialog session key encryption component 230). At 640, an encrypted message body, encryption being based, at least in part, upon the dialog session key, is provided (e.g., by a message body encryption component 240).

Figure 7:
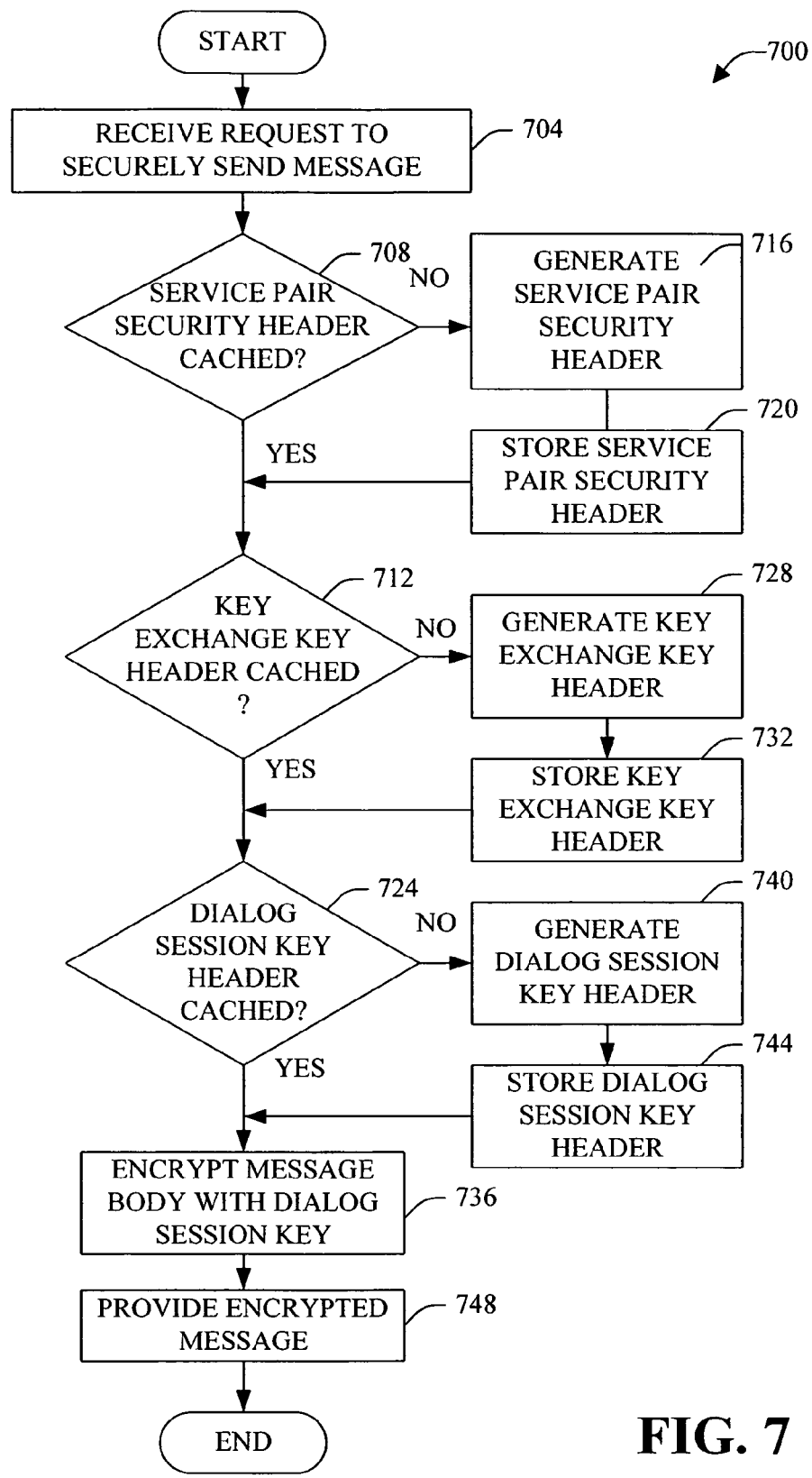
FIG. 7 is a flow chart of a method facilitating secure message generation in accordance with an aspect of the present invention.

Next, referring to FIG. 7, a method 700 facilitating secure message generation in accordance with an aspect of the present invention is illustrated. At 704, a request to securely send a message is received (e.g., by a message generator 250).

At 708, a determination is made as to whether a service pair security header associated with the message to be sent has been cached. If the determination at 708 is YES, processing continues at 712. If the determination at 708 is NO, at 716, a service pair secure header is generated. At 720, the service pair security header is stored (e.g., cached), and, processing continues at 712.

At 712, a determination is made as to whether a key exchange key header associated with the message to be sent has been cached. If the determination at 712 is YES, processing continues at 724. If the determination at 712 is NO, at 728, a key exchange key header is generated. At 732, the key exchange header is stored (e.g., cached), and, processing continues at 724.

At 724, a determination is made as to whether a dialog session key header associated with the message to be sent has been cached. If the determination at 724 is YES, processing continues at 736. If the determination at 724 is NO, at 740, a dialog session key header associated is generated. At 744, the dialog session key header is stored (e.g., cached), and, processing continues at 736.

At 736, a message body of the message to be sent is encrypted with the dialog session key. At 748, the encrypted message is provided, and, no further processing occurs.

Figure 8:
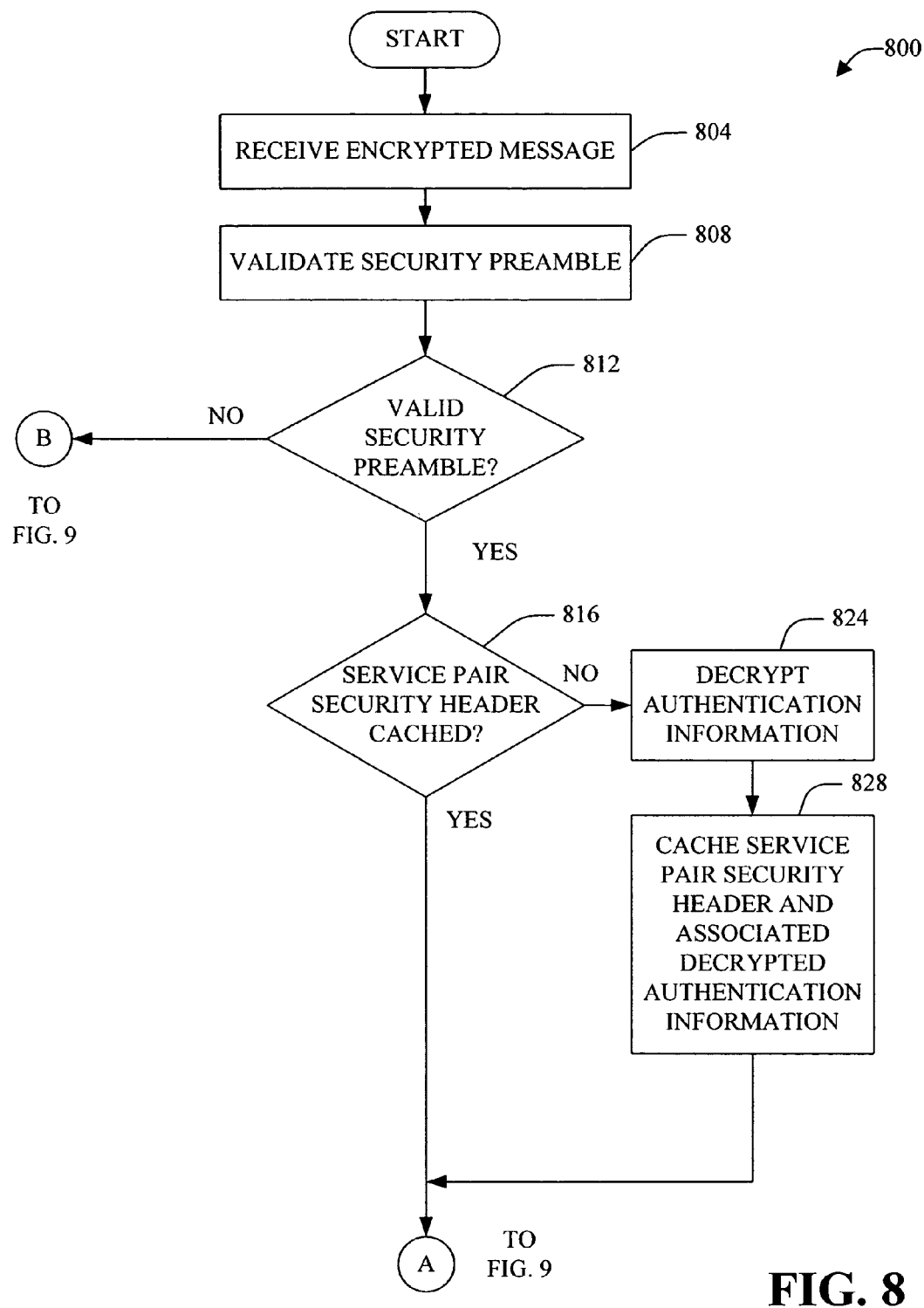
FIG. 8 is a flow chart of a method of receiving a secure message in accordance with an aspect of the present invention.
Figure 9:
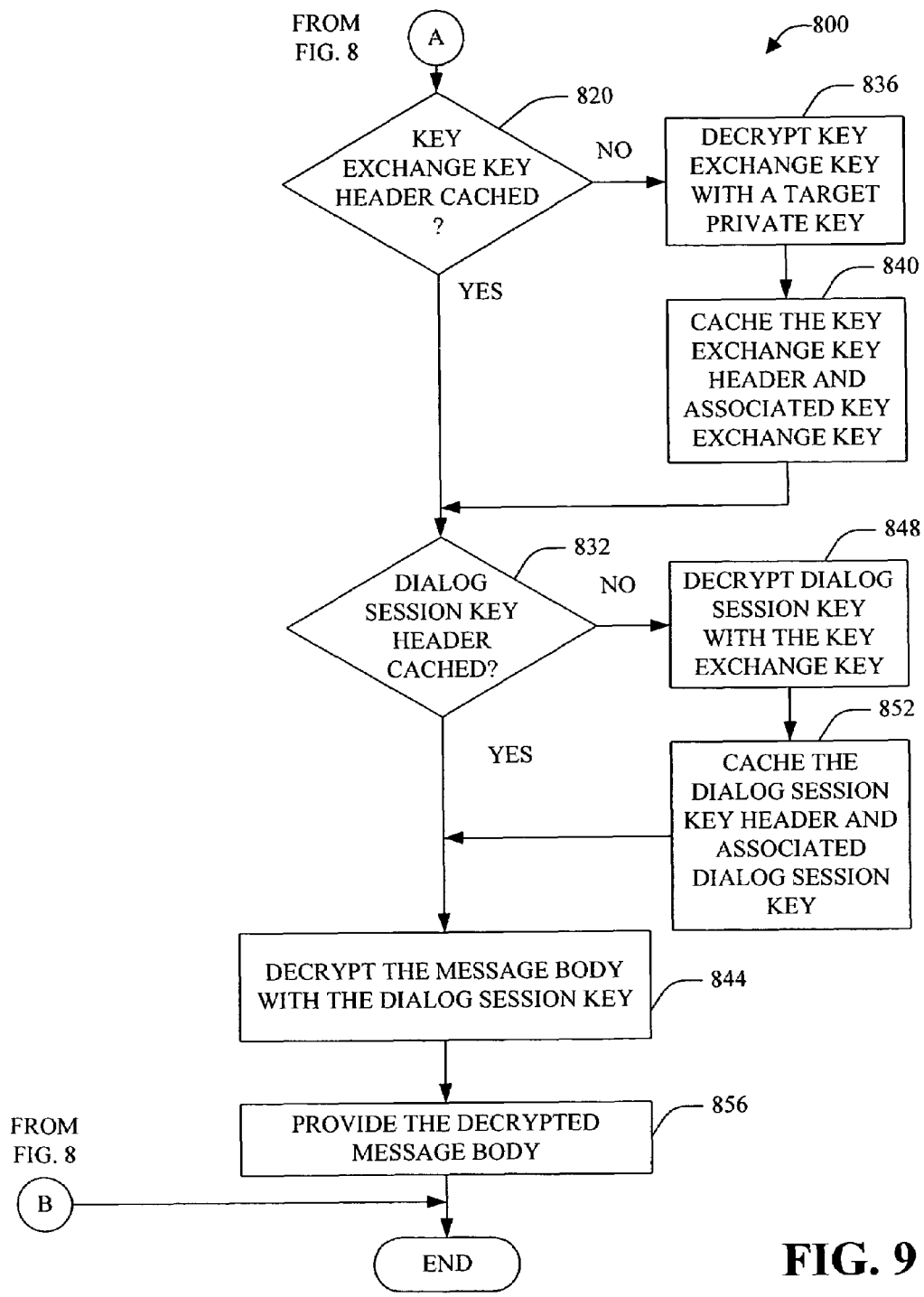
FIG. 9 is a flow chart further illustrating the method of FIG. 8 in accordance with an aspect of the present invention.

Turning to FIGS. 8 and 9, a method 800 of receiving a secure message in accordance with an aspect of the present invention is illustrated. At 804, an encrypted message is received. At 808, a security preamble of the encrypted message is validated. At 812, a determination is made as to whether the security preamble is valid. If the determination at 812 is NO, no further processing occurs.

If the determination at 812 is YES, at 816, a determination is made as to whether a service pair header is cached. If the determination at 816 is YES, processing continues at 820. If the determination at 816 is NO, at 824, authentication information is decrypted (e.g., with an initiator public key). At 828, the service pair security header and associated decrypted authentication information are cached, and, processing continues at 824.

At 824, a determination is made as to whether a key exchange key header is cached. If the determination at 820 is YES, processing continues at 832. If the determination at 820 is NO, at 836, a key exchange key is decrypted with a target private key. At 840, the key exchange key header and associated key exchange key are cached, and, processing continues at 832.

At 832, a determination is made as to whether a dialog session key header is cached. If the determination at 832 is YES, processing continues at 844. If the determination at 844 is NO, at 848, a dialog session key is decrypted with the key exchange key. At 852, the dialog session key header and associated dialog session key are cached, and, processing continues at 844.

At 844, the message body is decrypted with the dialog session key. At 856, the decrypted message body is provided, and, no further processing occurs.

Figure 10:
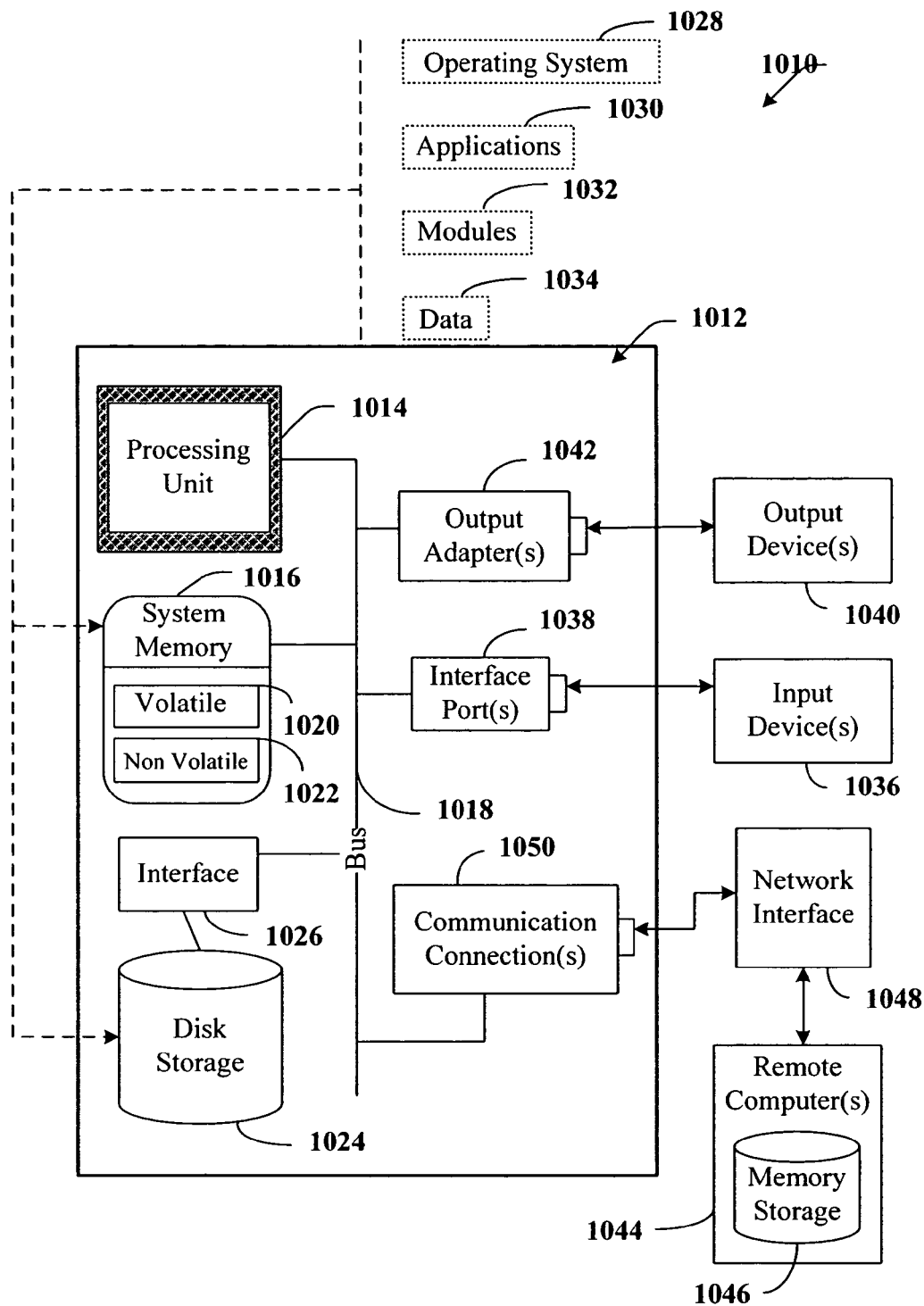
FIG. 10 illustrates an example operating environment in which the present invention may function.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communication system comprising:
   a secure message generation system that employs a first dialog session key to encrypt a first message to be sent to a second service, the secure message generation system is associated with a first service; and
   a secure message receiver system that employs a second dialog session key to decrypt a second message received from the second service, the secure message receiver system is associated with the first service, wherein the second dialog session key is created unilaterally by a secure message generation system associated with the second service in order to maintain secure message protocol and facilitate a reduction in latency in communications between the first service and the second service.

2. The communication system of claim 1, the secure message generation system comprising:
   a service pair encryption component that employs an initiator private key to encrypt authentication information;
   a key exchange key encryption component that employs a target public key to encrypt a key exchange key;
   a dialog session key encryption component that employs the key exchange key to encrypt the first dialog session key;
   a message body encryption component that employs the first dialog session key to encrypt a message body of the first message to be sent to the second service; and
   a message generator that provides the encrypted first message to the second service, the encrypted first message being based, at least in part, upon the encrypted authentication information, the encrypted key exchange key, the encrypted first dialog session key and the encrypted message body.

3. The communication system of claim 2, the key exchange key comprising a symmetric key.

4. The communication system of claim 2, the key exchange key comprising a 128-bit symmetric key.

5. The communication system of claim 2, the key exchange key uniquely assigned to the service and second service pair.

6. The communication system of claim 1, the secure message receiver system comprising:
   a message receiver that receives the encrypted second message;
   a service pair encryption component that employs an initiator public key to decrypt authentication information of the encrypted second message;
   a key exchange key decryption component that employs a target private key to decrypt a key exchange key of the encrypted second message, if the key exchange key is not stored in a cache;
   a dialog session key decryption component that employs the key exchange key to decrypt the second dialog session key of the encrypted second message, if the second dialog session key is not stored in the cache; and
   a message body decryption component that employs the second dialog session key to decrypt a message body of the encrypted second message.

7. The communication system of claim 1, a value of the first dialog session key changed based, at least in part, upon a dialog session key policy.

8. The communication system of claim 7, the dialog session key policy is time-based.

9. The communication system of claim 7, the dialog session key policy is based, at least in part, upon a shift in the second dialog session key.

10. The communication system of claim 1, a dialog is failed based, at least in part, upon a dialog session key policy.

11. The communication system of claim 10, the dialog session key policy is based a quantity of shifts of the second dialog session key in a given time period.

12. The communication system of claim 10, the dialog session key policy is based, at least in part, upon a failure of shift of the second dialog session key in given time period.

13. A method facilitating secure communication comprising:
   providing an encrypted first message of a dialog based, at least in part, upon a first dialog session key that is associated with a first service;
   creating a second dialog session key unilaterally, the second dialog session key is associated with a second service;
   providing the second dialog session key to the first service; and
   decrypting an encrypted second message of the dialog, decryption being based, at least in part, upon the second dialog session key.

14. The method of claim 13, the first dialog session key is changed based, at least in part, upon a dialog session key policy.

15. The method of claim 14, the dialog session key policy is time-based.

16. The method of claim 14, the dialog session key policy is based, at least in part, upon a shift in the second dialog session key.

17. The method of claim 14, the dialog session key policy is based a quantity of shifts of the second dialog session key in a given time period.

18. The method of claim 14, further comprising providing an encrypted first dialog session key, the encryption being based, at least in part, upon a key exchange key.

19. A computer readable medium having stored thereon computer executable instructions for carrying out the method of claim 13.

20. A data packet transmitted between two or more computer components that facilitates secure communication, the data packet comprising:
   a key exchange key header comprising an encrypted key exchange key;
   a dialog session key header comprising a first dialog session key encrypted with the key exchange key, the first dialog session key created autonomously by a first service; and
   a message body field comprising a message encrypted with the first dialog session key, the data packet received by a second service that employs a second dialog session key, created autonomously by the second service, to encrypt a message the service originates.

21. A computer readable medium storing computer executable components of a communication system, comprising:
   a secure message generation system component associated with a first service that employs a first dialog session key to encrypt a first message to be sent to a second service; and
   a secure message receiver system component associated with the first service that employs a second dialog session key, created unilaterally by the second service, to decrypt a second message received from the second service.

22. A computer-implemented communication system comprising:
   means for generating a secure first message employing a first dialog session key to encrypt a first message to be sent to a second service;
   means for receiving a secure second message from the second service; and
   means for decrypting the second message employing a second dialog session key that is created unilaterally by the second service.

* * * * *

UNITED STATES PATENT AND TRADEMARK OFFICE
CERTIFICATE OF CORRECTION

PATENT NO.         : 7,356,846 B2                                                    Page 1 of 1
APPLICATION NO.    : 10/824162
DATED              : April 8, 2008
INVENTOR(S)        : Scott A. Konersmann It is certified that error appears in the above-identified patent and that said Letters Patent is hereby corrected as shown below:

In column 7, line 35, delete "Apr.14, 2004" and insert -- Apr. 14, 2004 --, therefor.

Signed and Sealed this
Twenty-second Day of February, 2011

David J. Kappos
*Director of the United States Patent and Trademark Office*